United States Patent
Brokhman et al.

(10) Patent No.: US 10,102,173 B2
(45) Date of Patent: Oct. 16, 2018

(54) PENDING LOAD BASED FREQUENCY SCALING

(71) Applicant: Qualcomm Innovation Center, Inc., San Diego, CA (US)

(72) Inventors: Tatyana Brokhman, Kiryat Ata (IL); Asutosh Das, Hyderabad (IN); Talel Shenhar, Nahari (IL)

(73) Assignee: QUALCOMM Innovation Center, Inc., San Diego, CA (US)

( * ) Notice: Subject to any disclaimer, the term of this patent is extended or adjusted under 35 U.S.C. 154(b) by 411 days.

(21) Appl. No.: 15/143,001

(22) Filed: Apr. 29, 2016

(65) Prior Publication Data

US 2016/0342550 A1 Nov. 24, 2016

Related U.S. Application Data

(60) Provisional application No. 62/165,058, filed on May 21, 2015.

(51) Int. Cl.

| | | |
|---|---|---|
| *G06F 13/12* | (2006.01) | |
| *G06F 1/08* | (2006.01) | |
| *G06F 13/40* | (2006.01) | |
| *G06F 13/362* | (2006.01) | |
| *G06F 13/42* | (2006.01) | |

(52) U.S. Cl.
CPC ...... *G06F 13/4054* (2013.01); *G06F 13/3625* (2013.01); *G06F 13/4291* (2013.01); *Y02B 60/1228* (2013.01); *Y02B 60/1235* (2013.01); *Y02D 10/14* (2018.01); *Y02D 10/151* (2018.01)

(58) Field of Classification Search
CPC .............. G06F 1/04; G06F 1/08; G06F 1/324
USPC ......................................... 710/117; 713/600
See application file for complete search history.

(56) References Cited

U.S. PATENT DOCUMENTS

| | | | | |
|---|---|---|---|---|
| 2005/0044442 A1* | 2/2005 | Barr | ........................ | G06F 1/08 713/600 |
| 2005/0060594 A1* | 3/2005 | Barr | ....................... | G06F 1/206 713/600 |
| 2011/0213606 A1* | 9/2011 | Seaman | ..................... | H02J 3/00 703/18 |
| 2013/0304954 A1* | 11/2013 | Decesaris | ............... | G06F 13/38 710/110 |
| 2014/0344597 A1* | 11/2014 | Thumma | ................. | G06F 1/324 713/322 |

\* cited by examiner

*Primary Examiner* — Titus Wong
(74) *Attorney, Agent, or Firm* — Neugeboren O'Dowd PC

(57) ABSTRACT

Methods and devices for controlling frequency of a bus are disclosed. A method may include determining a total-pending load value indicative of a number of a bytes that will pass through the bus in the future and calculating an expected load value based upon i) the total-pending load value, ii) a number of bytes that passed through the bus during a prior time window, and iii) a time duration the bus was active during the prior time window. The frequency of the bus is decreased if the expected load value is less than a lower threshold and increased if the expected load value is greater than an upper threshold. A frequency of the bus is maintained if the expected load value is greater than the lower threshold and less than the upper threshold.

14 Claims, 4 Drawing Sheets

PENDING LOAD BASED FREQUENCY SCALING

CLAIM OF PRIORITY UNDER 35 U.S.C. § 119

The present Application for Patent claims priority to Provisional Application No. 62/165,058 entitled "Pending Load Based Frequency Scaling" filed May 21, 2015, and assigned to the assignee hereof and hereby expressly incorporated by reference herein.

BACKGROUND

1. Field

The present disclosed embodiments relate generally to computing devices, and more specifically to frequency control of multi-core processors of computing devices.

2. Background

Electronic devices, such as mobile phones, personal digital assistants (PDAs), and the like, are commonly manufactured using application specific integrated circuit (ASIC) designs. Developments in achieving high levels of silicon integration have allowed creation of complicated ASICs and field programmable gate array (FPGA) designs. These ASICs and FPGAs may be provided in a single chip to provide a system-on-a-chip (SOC). An SOC provides multiple functioning subsystems on a single semiconductor chip, such as for example, processors, multipliers, caches, and other electronic components. SOCs are particularly useful in portable electronic devices because of their integration of multiple subsystems that can provide multiple features and applications in a single chip. Further, SOCs may allow smaller portable electronic devices by use of a single chip that may otherwise have been provided using multiple chips.

To communicatively interface multiple diverse components or subsystems together within a circuit provided on a chip(s), which may be an SOC as an example, an interconnect communications bus, also referred to herein simply as a bus, is provided. The bus is provided using circuitry, including clocked circuitry, which may include as examples registers, queues, and other circuits to manage communications between the various subsystems. The circuitry in the bus is clocked with one or more clock signals generated from a master clock signal that operates at the desired bus clock frequency(ies) to provide the throughput desired.

In applications where reduced power consumption is desirable, the bus clock frequency can be lowered, but lowering the bus clock frequency lowers performance of the bus. If lowering the clock frequency of the bus increases latencies beyond latency requirements or conditions for the subsystems coupled to the bus interconnect, the performance of the subsystem may degrade or fail entirely. Rather than risk degradation or failure, the bus clock may be set to higher frequencies to reduce latency and provide performance margin, but providing a higher frequency consumes more power.

Although frequency selection based on the past load on the system bus works on some targets, trying to predict the future load based on the past load often results in making a decision regarding the selected frequency that is less than optimal.

SUMMARY

According to an aspect, a method for controlling a frequency of a bus on a computing device is disclosed. The method includes determining a total-pending load value indicative of a number of a bytes that will pass through the bus in the future and calculating an expected load value based upon i) the total-pending load value, ii) a number of bytes that passed through the bus during a prior time window, and iii) a time duration the bus was active during the prior time window. The frequency of the bus is decreased if the expected load value is less than a lower threshold, and the frequency is increased if the expected load value is greater than an upper threshold. And the frequency of the bus is maintained if the expected load value is greater than the lower threshold and less than the upper threshold.

According to yet another aspect, a computing device includes at least one memory storage component, a bus coupled to the at least one memory storage component, and a kernel layer a block-aware governor configured to determine an operating frequency of the bus based upon the future load of the bus, the block-aware governor including a frequency adjustment component to send a frequency adjustment signal to a low level driver to prompt a bus-specific frequency control signal to the bus that places the bus at the operating frequency.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
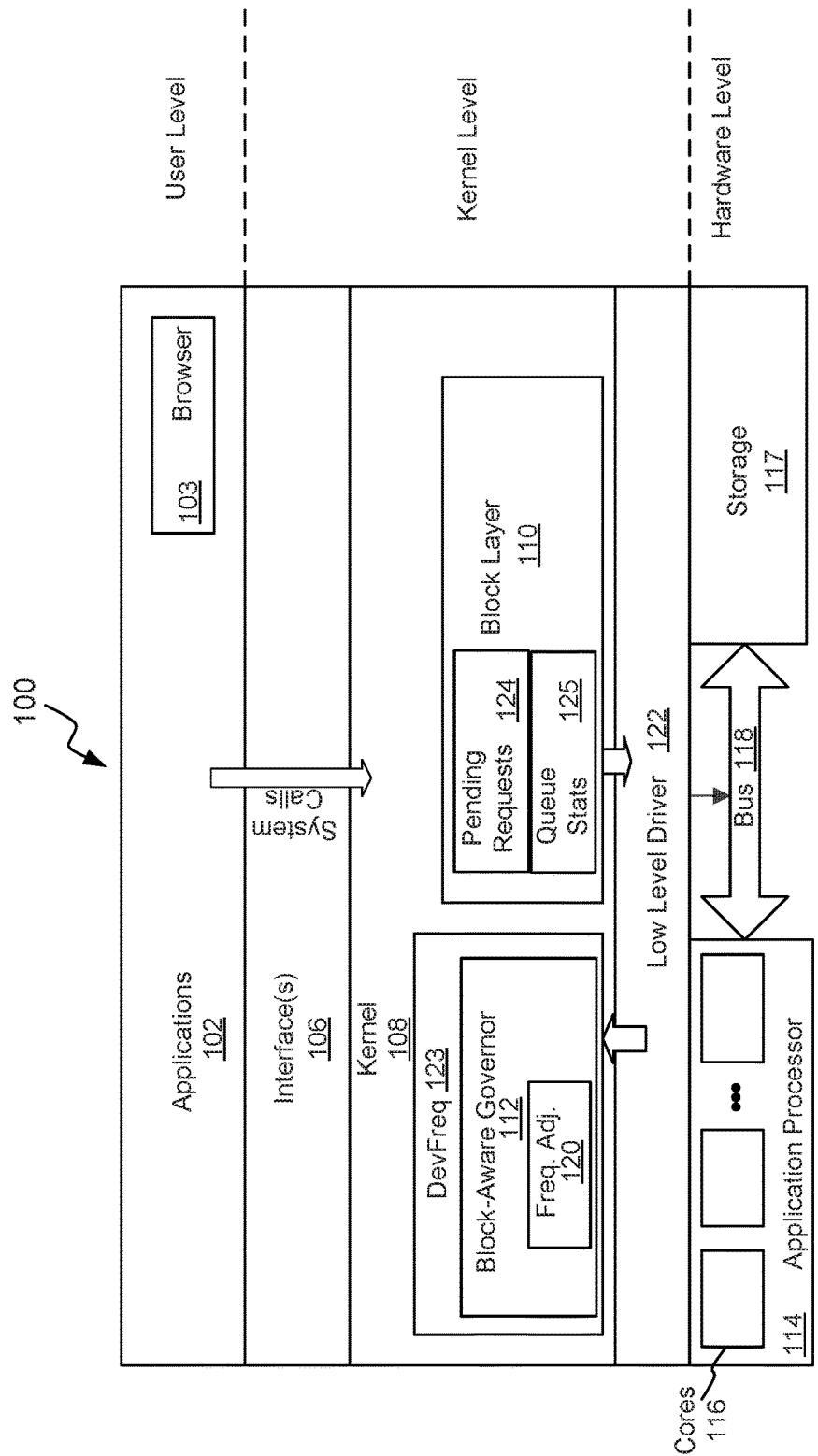
FIG. 1 is a block diagram depicting functional components of a computing device.

Referring to FIG. 1, it is a block diagram illustrating components of a computing system 100 (also referred to herein as a computing device 100). The block diagram includes applications 102 (e.g., a web browser 103) at the highest level of abstraction and hardware such as an applications processor 114 and processing cores 116 that are coupled to storage 117 via a bus 118 at the lowest level.

The one or more applications 102 may be realized by a variety of applications that operate via, or run on, the app processor 114. For example, the one or more applications 102 may include a web browser 103 and associated plug-ins, entertainment applications (e.g., video games, video players), productivity applications (e.g., word processing, spread sheet, publishing applications, video editing, photo editing applications), core applications (e.g., phone, contacts), and augmented reality applications.

The kernel 108 along with interface 106 enable communication between the applications 102 and the applications processor 114. In particular, the interface 106 passes system calls from the applications 102 to the kernel 108. Also shown is a low level driver layer 122 (also referred to as a low level driver 122), which generally represents one or more low level drivers that enable the kernel 108 to communicate with, and/or control, hardware devices such as the application processor 114, the bus 118, and the storage 117 at the hardware level.

The storage 117 may include one or more non-volatile memory devices (e.g., secure digital (SD) cards and internally-mounted flash memory), and the low level driver layer 122 may include one or more corresponding drivers that enable formatting and communications with the memory devices. In addition, the low level driver layer 122 may include a driver that enables communication with, and control over, the bus 118.

As shown, the kernel 108 in this embodiment includes a DevFreq framework 123 that includes a block-aware governor 112 and a frequency adjustment module 120. The DevFreq framework 123 generally functions as a framework to enable adjustments to clock frequencies of devices by communicating with one or more low level drivers represented by the low level driver 122. In addition, the kernel 108 includes a block layer 110 that includes a pending request queue 124.

The block layer 110 generally functions as an abstraction for block devices in the computing device 100. As one of ordinary skill in the art will appreciate, the block devices may be physical or logical. The block layer 110 in this embodiment is configured to receive input/output (I/O) requests (e.g., from applications 102) and place the requests in a pending requests queue 124, and the block layer 110 is responsible for passing the requests to/from the block devices. As one of ordinary skill in the art will appreciate, the pending I/O requests are scheduled to be submitted to the devices by an I/O scheduler (not shown in FIG. 1 for clarity).

In the present embodiment, the block layer 110 has been modified to include a queue status module 125, which generally operates to provide information about the pending load. For example, the queue status module may provide information about the number of bytes pending in the scheduler, a number of bytes pending in a dispatch queue, a number of bytes dispatched to the low level driver 122, (but yet to be completed); and a number of bytes completed during the last polling interval (also referred to as a time window).

The block-aware governor 112 generally operates to determine an operating frequency for the bus 118 based upon the future load on the bus 118, which is defined, at least in part, by the requests pending in the block layer (represented by the pending requests queue 124). And the frequency adjustment module 120 operates to effectuate the operating frequency by sending a frequency control signal, via the DevFreq framework 123, to the low level driver 122, which in turn, controls the bus 118 by sending a bus-specific signal to the bus 118.

As shown, a block layer 110 at the kernel layer includes a queue of pending requests 124, and the block-aware governor 112 is disposed to obtain information about the future load via the low level driver 122 and DevFreq framework 123 by accessing the queue status module 125 of the block layer 110 to retrieve queue stats information (e.g., statistical information) about the pending load.

As one of ordinary skill in the art will appreciate, the user-space and kernel-space components depicted in FIG. 1 may be realized by hardware in connection with processor-executable code stored in a non-transitory tangible processor readable medium such as nonvolatile memory, and can be executed by app processor 114. Numerous variations on the embodiments herein disclosed are also possible.

One of ordinary skill will also appreciate that the depicted kernel 108 may be realized by a modified LINUX kernel that is adapted to control voltage and frequency scaling of the bus 118 based upon the future, pending load of the pending requests in the pending requests queue 124. As described herein, the kernel 108 may be modified by the addition of a new block-aware governor 112. In prior versions of the LINUX kernel, a dynamic voltage and frequency scaling (DVFS) scheme was available to reduce power consumption (by reducing frequency and voltage), but the prior implementations were backward-looking, at prior loads, instead of forward looking to the pending load.

In operation, the low level driver (LLD) 122 registers with the DevFreq framework 123 and provides the following parameters:

Polling interval in milliseconds (polling_intr);
callback function for retrieving device status;
callback function for setting required frequency; and
name of the chosen governor to manage the device (e.g., name of the block-aware governor 112).

In response, the DevFreq framework 123 sets a timer to wake up every polling_intr milliseconds, and when the timer fires:

DevFreq framework 123 obtains device status by calling provided callback;
Device status is passed to the block-aware governor 112;
The block-aware 112 governor analyzes the status and makes a decision about the operating frequency of the bus 118, and the frequency adjustment module 120 provides a frequency adjustment signal.

The DevFreq framework 123 communicates the frequency adjustment signal to the lower level driver to set the frequency of the bus 118 to the operating frequency selected by the block-aware governor 112.

In the depicted embodiment, the low level driver 122 provides the following data in response to a status request:

Total_time is a length of time, in milliseconds, which is the time passed since last asked for status. And as used herein, the total_time is typically equal to the polling interval (polling_intr);
Busy_time in milliseconds, which is how long (since last requested) the low level driver 122 was busy; and
Current frequency.

Prior art governors are known to calculate the load (busy_time/total_time) during last polling interval and make a decision about the frequency based on that prior load. In the present embodiment, it is possible to estimate the future load placed on the bus 118 and make a more accurate decision of the required frequency. More specifically, the future load estimation is available because information on the pending load is available from the block layer 110. The block-aware governor 112 makes the decision on the frequency (e.g., optimal frequency) not based on the past, but on the future load; thus achieving better performance and power saving.

Methodology

Input Parameters

During initialization, the following parameter values are provided by the low level driver 122:

Upthreshold—is an upper threshold value, and if the expected load is over this value, the block-aware governor 112 increases the operational frequency of the bus 118.
Downthreshold—is a lower threshold value, and if the expected load is under this value, the frequency is decreased.

In response to a status request, the following parameter values are provided by the low level driver 122 on status request:

total_time—is a total time represented since the lower level driver 122 was last requested for status;

busy_time—is the time the bus 118 was active during a prior time window (total_time);

current_frequency—is the operating frequency of the bus 118; and queue_stats—is a statistical value indicative of the pending load.

And the following parameter values are available from the queue status module 125 of the block layer 110:

bytes_pending—is a number of bytes pending in the scheduler;

bytes_queued—is number of bytes pending in dispatch queue;

bytes_inflight—is number of bytes dispatched to the low level driver 122 that are in flight, but yet to be completed; and bytes_completed—is a number of bytes completed during the last polling interval.

Main Methodology

Figure 2:
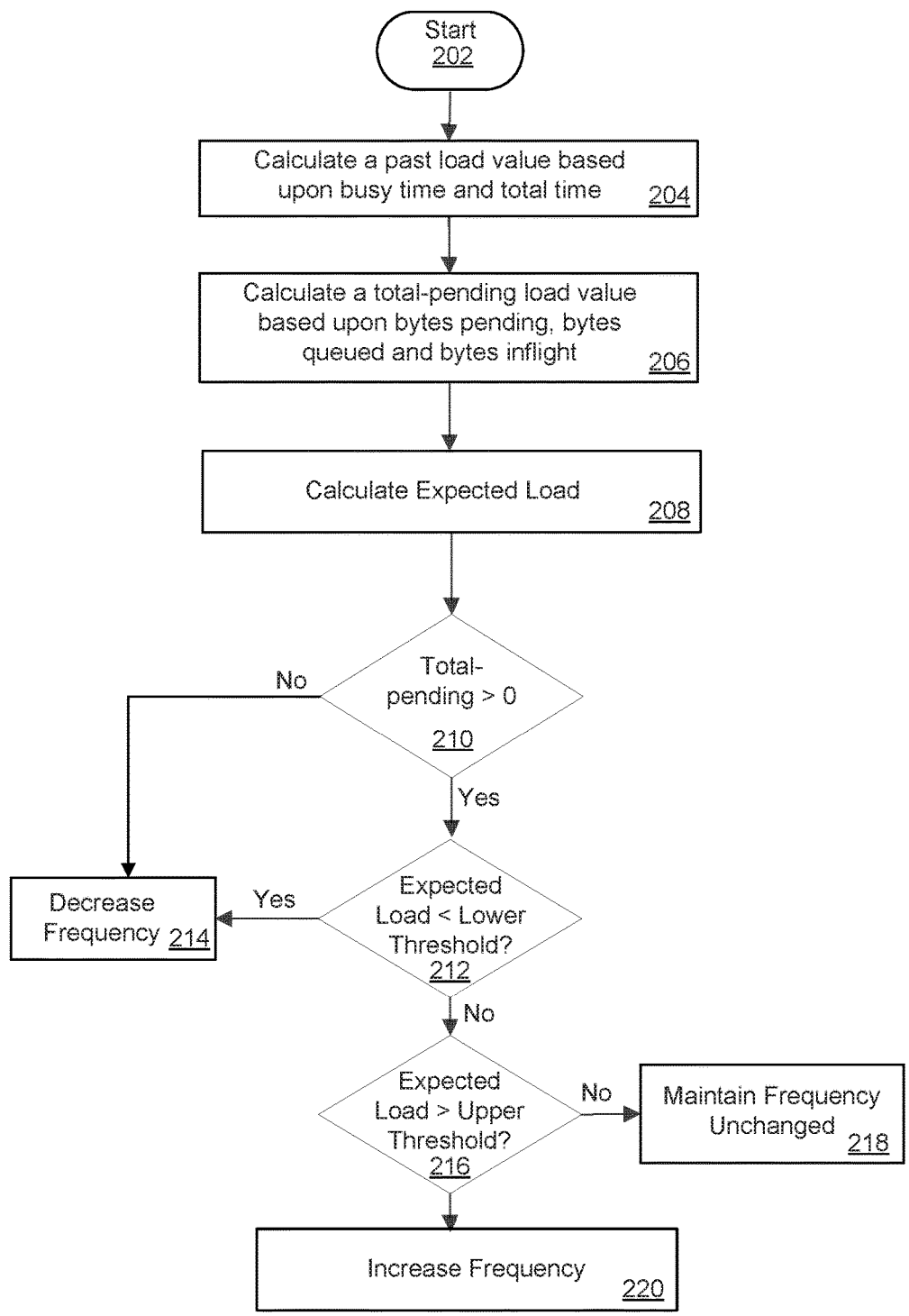
FIG. 2 is a flowchart depicting a method that may be traversed in connection with the embodiment shown in FIG. 1.

Referring next to FIG. 2, shown is a flowchart depicting a method that may be traversed in connection with the embodiments disclosed herein. In many embodiments, the method depicted in FIG. 2 is carried out periodically with a period of the polling interval (polling_intr). As shown, at the start of potential bus-frequency adjustment (Block 202), a past load value is calculated based upon the busy_time value and the total time value (Block 204):

$$\text{past load} = \frac{busy\_time}{total\_time}.$$

A total-pending load value (totalPending), which is indicative of a number of pending bytes not yet passed through the bus, is then calculated as: total-pending load (totalPending)=bytes_pending+bytes_queued+bytes_inflight (Block 206). And the expected load is then calculated (Block 208) as:

$$\text{expected load}(currFreq) = \frac{\left(\frac{busy\_time}{bytes\_completed} * totalPending\right)}{total\_time}.$$

As shown in FIG. 2, if the total pending load (totalPending also referred to as total_pending load value) is not greater than zero, then the block-aware governor 112 prompts the frequency adjustment module 120 to send a frequency adjustment signal to the low level driver 122 to decrease the frequency of the bus 118 (Block 214). In addition, if the total pending load (totalPending) is greater than zero (Block 210), and the expected load is lower than the lower threshold (Block 212), then the block-aware governor 112 prompts the frequency adjustment module 120 to send a frequency adjustment signal to the low level driver 122 to decrease the frequency of the bus 118 (Block 214).

Figure 3:
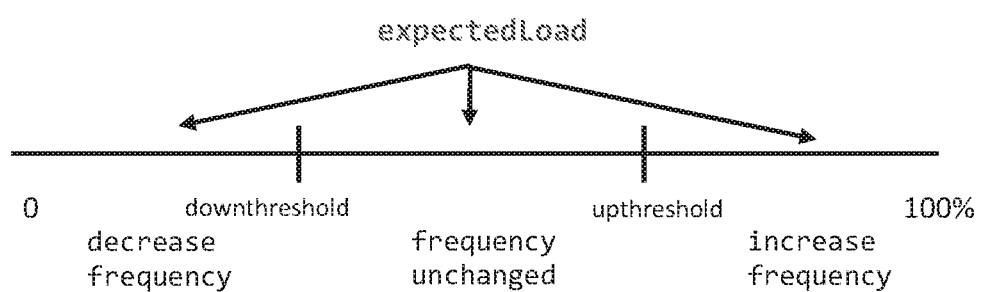
FIG. 3 is a diagram representing the logic associated with the flowchart of FIG. 2.

But if the expected load is greater than the lower threshold (Block 212) and is less than the upper threshold (Block 216), then the frequency remains unchanged (Block 218). And if the expected load value is greater than the upper threshold (Block 216), then the block-aware governor 112 prompts the frequency adjustment module 120 to send a frequency adjustment signal to the low level driver 122 to increase the frequency of the bus 118 (Block 220). FIG. 3 depicts the methodology of FIG. 2 in a simple representation of logic and process flow.

In many embodiments, the low level driver 122 determines the actual frequency value that is selected. In some embodiments for example, the low level driver 122 provides a frequency table (e.g., a table of frequency values that the cores may operate at). In these embodiments, the DevFreq framework 123 "knows" a current frequency (returned from the low level driver 122 as part of the status request), so if the block-aware governor 112 increases the frequency (Block 220), the current frequency in the table may be accessed to identify and return a next higher frequency in the table. In the alternative, if the driver does not supply a frequency table, the block-aware governor 112 may simply return one of three values: 1=increase (by a given step size) from current frequency; 0=remain the same; and −1=decrease (by a give step size) the current frequency.

Figure 4:
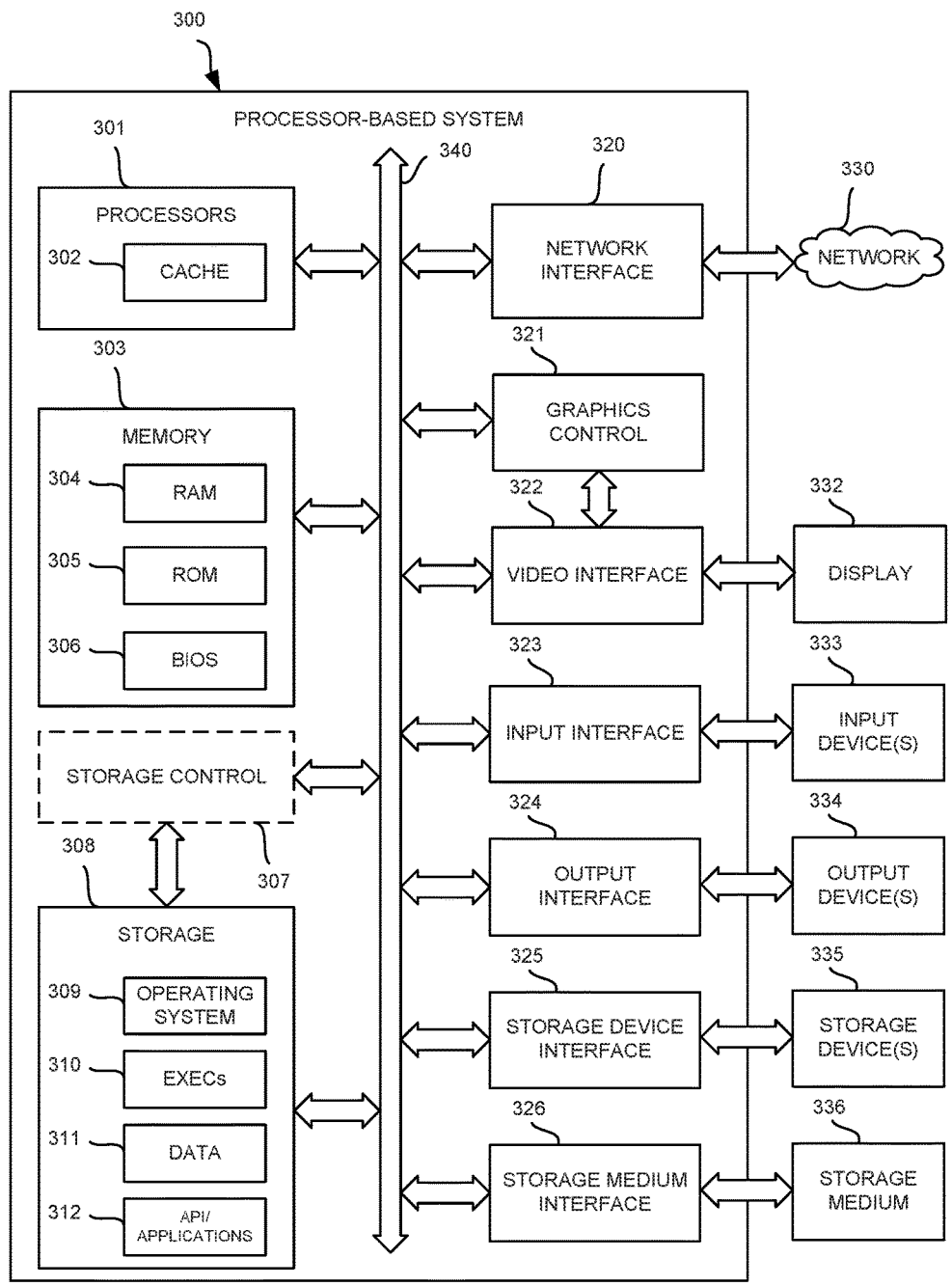
FIG. 4 is a block diagram depicting physical components of a computing device.

The systems and methods described herein can be implemented in a machine such as a processor-based system in addition to the specific physical devices described herein. FIG. 4 shows a diagrammatic representation of one embodiment of a machine in the exemplary form of a processor-based system 300 within which a set of instructions can execute for causing a device to perform or execute any one or more of the aspects and/or methodologies of the present disclosure. The components in FIG. 4 are examples only and do not limit the scope of use or functionality of any hardware, software, embedded logic component, or a combination of two or more such components implementing particular embodiments.

Processor-based system 300 may include processors 301, a memory 303, and storage 308 that communicate with each other, and with other components, via a bus 340. The bus 340 may also link a display 332 (e.g., touch screen display), one or more input devices 333 (which may, for example, include a keypad, a keyboard, a mouse, a stylus, etc.), one or more output devices 334, one or more storage devices 335, and various tangible storage media 336. All of these elements may interface directly or via one or more interfaces or adaptors to the bus 340. For instance, the various non-transitory tangible storage media 336 can interface with the bus 340 via storage medium interface 326. Processor-based system 300 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processors 301 (or central processing unit(s) (CPU(s))) optionally contain a cache memory unit 302 for temporary local storage of instructions, data, or computer addresses. Processor(s) 301 are configured to assist in execution of processor-executable instructions. Processor-based system 300 may provide functionality as a result of the processor(s) 301 executing software embodied in one or more tangible, non-transitory processor readable storage media, such as memory 303, storage 308, storage devices 335, and/or storage medium 336. The processor-readable media may store software that implements particular embodiments, and processor(s) 301 may execute the software. For example, processor-executable code may be executed to realize components of the kernel 108, interfaces 106, and applications 102. Memory 303 may read the software from one or more other processor-readable media (such as mass storage device(s) 335, 336) or from one or more other sources through a suitable interface, such as network interface 320. The software may cause processor(s) 301 to carry out one or more processes or one or more steps of one or more processes described or illustrated herein such as the frequency scaling of one or more of the cores 116 based upon the pending, future load. Carrying out such processes or steps may include defining data structures stored in memory 303 and modifying the data structures as directed by the software.

The memory 303 may include various components (e.g., machine readable media) including, but not limited to, a random access memory component (e.g., RAM 304) (e.g., a static RAM "SRAM", a dynamic RAM "DRAM, etc.), a read-only component (e.g., ROM 305), and any combinations thereof. ROM 305 may act to communicate data and instructions unidirectionally to processor(s) 301, and RAM 304 may act to communicate data and instructions bidirectionally with processor(s) 301. ROM 305 and RAM 304 may include any suitable tangible processor-readable media described below. In one example, a basic input/output system 306 (BIOS), including basic routines that help to transfer information between elements within processor-based system 300, such as during start-up, may be stored in the memory 303.

Fixed storage 308 is connected bidirectionally to processor(s) 301, optionally through storage control unit 307. Fixed storage 308 provides additional data storage capacity and may also include any suitable tangible processor-readable media described herein. Storage 308 may be used to store operating system 309, EXECs 310 (executables), data 311, APV applications 312 (application programs), and the like. Often, although not always, storage 308 is a secondary storage medium (such as a hard disk) that is slower than primary storage (e.g., memory 303). Storage 308 can also include an optical disk drive, a solid-state memory device (e.g., flash-based systems), or a combination of any of the above. Information in storage 308 may, in appropriate cases, be incorporated as virtual memory in memory 303.

In one example, storage device(s) 335 may be removably interfaced with processor-based system 300 (e.g., via an external port connector (not shown)) via a storage device interface 325. Particularly, storage device(s) 335 and an associated machine-readable medium may provide nonvolatile and/or volatile storage of machine-readable instructions, data structures, program modules, and/or other data for the processor-based system 300. In one example, software may reside, completely or partially, within a machine-readable medium on storage device(s) 335. In another example, software may reside, completely or partially, within processor(s) 301.

Bus 340 connects a wide variety of subsystems. Herein, reference to a bus may encompass one or more digital signal lines serving a common function, where appropriate. Bus 340 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Processor-based system 300 may also include an input device 333. In one example, a user of processor-based system 300 may enter commands and/or other information into processor-based system 300 via input device(s) 333. Examples of an input device(s) 333 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 333 may be interfaced to bus 340 via any of a variety of input interfaces 323 (e.g., input interface 323) including, but not limited to, serial, parallel, game port, USB, FIREWIRE, THUNDERBOLT, or any combination of the above.

In particular embodiments, when processor-based system 300 is connected to network 330, processor-based system 300 may communicate with other devices, specifically mobile devices and enterprise systems, connected to network 330. Communications to and from processor-based system 300 may be sent through network interface 320. For example, network interface 320 may receive incoming communications (such as requests or responses from other devices) in the form of one or more packets (such as Internet Protocol (IP) packets) from network 330, and processor-based system 300 may store the incoming communications in memory 303 for processing. Processor-based system 300 may similarly store outgoing communications (such as requests or responses to other devices) in the form of one or more packets in memory 303 and communicated to network 630 from network interface 320. Processor(s) 301 may access these communication packets stored in memory 303 for processing.

Examples of the network interface 320 include, but are not limited to, a network interface card, a modem, and any combination thereof. Examples of a network 330 or network segment 330 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 630, may employ a wired and/or a wireless mode of communication. In general, any network topology may be used.

Information and data can be displayed through a display 332. Examples of a display 332 include, but are not limited to, a liquid crystal display (LCD), an organic liquid crystal display (OLED), a cathode ray tube (CRT), a plasma display, and any combinations thereof. The display 632 can interface to the processor(s) 301, memory 303, and fixed storage 308, as well as other devices, such as input device(s) 333, via the bus 340. The display 332 is linked to the bus 340 via a video interface 322, and transport of data between the display 332 and the bus 340 can be controlled via the graphics control 321.

In addition to a display 332, processor-based system 300 may include one or more other peripheral output devices 334 including, but not limited to, an audio speaker, a printer, and any combinations thereof. Such peripheral output devices may be connected to the bus 340 via an output interface 324. Examples of an output interface 324 include, but are not limited to, a serial port, a parallel connection, a USB port, a FIREWIRE port, a THUNDERBOLT port, and any combinations thereof.

In addition or as an alternative, processor-based system 300 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a processor-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, or hardware in connection with software. Various illustrative components, blocks, modules, circuits, and steps have been described above generally in terms of their functionality. Whether such functionality is implemented as hardware or hardware that utilizes software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in a software module executed by a processor. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for controlling frequency of a bus on a computing device, the method comprising:
   determining a total-pending load value indicative of a number of a bytes that will pass through the bus in the future;
   calculating an expected load value based upon i) the total-pending load value, ii) a number of bytes that passed through the bus during a prior time window, and iii) a time duration the bus was active during the prior time window;
   decreasing the frequency of the bus if the expected load value is less than a lower threshold;
   increasing the frequency of the bus if the expected load value is greater than an upper threshold; and
   maintaining the frequency of the bus if the expected load value is greater than the lower threshold and less than the upper threshold.

2. The method of claim 1, wherein the total-pending load value is equal to bytes_pending+bytes_queued+bytes_inflight, wherein bytes_pending is a number of bytes pending in a scheduler of the computing device, bytes_inflight is a number of bytes dispatched to a low level driver of the computing device and not yet completed, and bytes_pending is a number of bytes pending in the scheduler.

3. The method of claim 2, wherein the expected load value is calculated as:

$$\left(\frac{\frac{busy\_time}{bytes\_completed} * totalPending}{total\_time}\right)$$

wherein the busy_time is a time duration the bus was active during the prior time window, bytes_completed is the number of bytes completed by the bus during the prior time window, and total_time is a length of time of the prior time window.

4. The method of claim 1, wherein determining a total-pending load value and calculating the expected load value includes retrieving queue stats from a block layer of a kernel of the computing device.

5. The method of claim 4, wherein the queue stats are selected from the group consisting of bytes_pending, bytes_queued, bytes_inflight, and bytes completed.

6. A computing device comprising:
   at least one memory storage component;
   a bus coupled to the at least one memory storage component;
   a kernel layer including:
     a block layer including:
       a pending requests queue of requests to access the at least one memory component; and
       a queue stats module configured to provide information about a future load of the bus; and
     a block-aware governor configured to determine an operating frequency of the bus based upon the future load of the bus, the block-aware governor including a frequency adjustment component to send a frequency adjustment signal to a low level driver to prompt a bus-specific frequency control signal to the bus that places the bus at the operating frequency.

7. The computing device of claim 6, wherein the low level driver is coupled to the kernel layer and the bus, wherein communications between the block-aware governor and the block layer are completed via the low level driver.

8. The computing device of claim 7, wherein the low level driver is configured to provide an upper threshold and a lower threshold to the block-aware governor, wherein the block aware governor is configured to decrease the operating frequency of the bus if an expected load value is less than a lower threshold, increase the operating frequency of the bus if the expected load value is greater than an upper threshold, and maintaining the operating frequency of the bus if the expected load value is greater than the lower threshold and less than the upper threshold.

9. The computing device of claim 7 including a DevFreq framework that is coupled to the low level driver, wherein the DevFreq framework is configured to pass communications between the lower level driver and the block-aware governor.

10. A non-transitory, tangible processor readable storage medium, encoded with processor readable instructions to perform a method for controlling frequency of a bus on a computing device, the method comprising:
 determining a total-pending load value indicative of a number of a bytes that will pass through the bus in the future;
 calculating an expected load value based upon i) the total-pending load value, ii) a number of bytes that passed through the bus during a prior time window, and iii) a time duration the bus was active during the prior time window;
 decreasing the frequency of the bus if the expected load value is less than a lower threshold;
 increasing the frequency of the bus if the expected load value is greater than an upper threshold; and
 maintaining the frequency of the bus if the expected load value is greater than the lower threshold and less than the upper threshold.

11. The non-transitory, tangible processor readable storage medium of claim 10, wherein the total-pending load value is equal to bytes_pending+bytes_queued+bytes_inflight, wherein bytes_pending is a number of bytes pending in a scheduler of the computing device, bytes_inflight is a number of bytes dispatched to a low level driver of the computing device and not yet completed, and bytes_pending is a number of bytes pending in the scheduler.

12. The non-transitory, tangible processor readable storage medium of claim 11, wherein the expected load value is calculated as:

$$\frac{\left(\frac{busy\_time}{bytes\_completed} * totalPending\right)}{total\_time}$$

wherein the busy_time is a time duration the bus was active during the prior time window, bytes_completed is the number of bytes completed by the bus during the prior time window, and total_time is a length of time of the prior time window.

13. The non-transitory, tangible processor readable storage medium of claim 10, wherein determining a total-pending load value and calculating the expected load value includes retrieving queue stats from a block layer of a kernel of the computing device.

14. The non-transitory, tangible processor readable storage medium of claim 13, wherein the queue stats are selected from the group consisting of bytes_pending, bytes_queued, bytes_inflight, and bytes_completed.

* * * * *